United States Patent [19]

Taylor

[11] Patent Number: 5,065,013

[45] Date of Patent: Nov. 12, 1991

[54] OPTICAL ENCODERS USING TRANSMITTED AND REFLECTED LIGHT DETECTION HAVING COMPLEMENTARY OUTPUT

[75] Inventor: Robert M. Taylor, Cheltenham, England

[73] Assignee: Smiths Industries Public Limited Company, London, England

[21] Appl. No.: 584,626

[22] Filed: Sep. 19, 1990

[30] Foreign Application Priority Data

Feb. 21, 1989 [GB] United Kingdom ............... 8921338.3

[51] Int. Cl.⁵ .............................................. G01D 5/34
[52] U.S. Cl. ............................ 250/231.18; 250/237 G
[58] Field of Search ................... 250/231.16, 231.17, 250/231.18, 237 G; 341/13; 356/374, 375

[56] References Cited

U.S. PATENT DOCUMENTS

| | | | |
|---|---|---|---|
| 4,135,086 | 1/1979 | Baba | 250/237 G |
| 4,560,280 | 12/1985 | Iwamoto et al. | 356/375 |
| 4,633,224 | 12/1986 | Gipp et al. | 250/231.18 |
| 4,672,201 | 6/1987 | Welker | 250/231.16 |
| 4,684,257 | 8/1987 | Hanaoka et al. | 250/237 G |
| 4,823,000 | 4/1989 | Onyon | 250/237 G |

Primary Examiner—Davis L. Willis
Assistant Examiner—Stephone Allen
Attorney, Agent, or Firm—Pollock, VandeSande and Priddy

[57] ABSTRACT

An optical encoder has an optically-encoded plate having parallel tracks each comprising alternate opaque, reflective regions and transparent, non-reflective regions which differ in length between the tracks. LED's direct radiation onto one side of each track. Detectors located on one side of the plate provide an output in response to radiation reflected from the reflective regions of each track; detectors located on the opposite side of the plate provide an output in response to radiation transmitted through the transparent regions. The outputs from the detectors are normally complementary. A processor detects any loss of complementarity and determines the position of the plate close to the boundary between adjacent regions by comparing the detector outputs as one falls and the other rises.

11 Claims, 1 Drawing Sheet

OPTICAL ENCODERS USING TRANSMITTED AND REFLECTED LIGHT DETECTION HAVING COMPLEMENTARY OUTPUT

BACKGROUND OF THE INVENTION

This invention relates to optical encoders.

Optical encoders are arranged to operate in either a transmission or a reflection mode. One such encoder is described, for example, in GB 2188144A which operates in a reflection mode. In this encoder, a disc carries a reflective track of spiral shape so that, as the disc rotates underneath a read head, the radiation reflected back varies in a way that can be detected to determine the angular position of the disc. Other forms of encoder have a plate with several parallel tracks having alternate transparent and opaque (or reflective and non-reflective) regions which differ in length between the tracks. Individual sensors in the read head detect whether the sensor is aligned with a transparent region or an opaque region in the respective track and thereby enable the position of the encoder to be determined to a resolution dependent on the length of the smallest region. Such an encoder is described, for example in GB Patent Application 9010248. Many different variations of encoder have been proposed.

One difficulty with optical encoders is that erroneous readings can be produced if, for example, dirt prevents transmission of radiation through what should be a transparent region, or if wear prevents reflection from what should be a reflective region.

Where the encoder is intended for use in critical applications, its correct operation can be confirmed by dividing the encoder plate into two or more separate and identical regions each having its own respective read head. The outputs from the different read heads can then be compared to confirm correct operation. This arrangement has the disadvantage of either limiting the range of displacement that can be measured, or increasing the size of the encoder plate.

BRIEF SUMMARY OF THE INVENTION

It is an object of the present invention to provide an optical encoder that can be used to avoid this difficulty.

According to the present invention there is provided an optical encoder including an optically-encoded plate having regions that are optically reflective and opaque and regions that are non-reflective and transparent, the optical encoder including a radiation source located on one side of the plate and arranged to direct radiation onto the plate, a first detector located on the one side of the plate and arranged to provide a first output in response to radiation reflected from the reflective regions, a second detector located on the opposite side of the plate and arranged to provide a second output in response to radiation transmitted through the transparent regions of the plate such that the first and second outputs are normally complementary, and the encoder being arranged to detect loss of complementarity of the first and second outputs.

The plate preferably has a plurality of parallel tracks each having alternate reflective and non-reflective regions, regions of one track differing in length from regions of another track and the encoder including a first detector located on one side of each track to provide an output in response to radiation reflected from the reflective regions of each track and a second detector located on the opposite side of each track that provides an output in response to radiation transmitted through the transparent regions of each track.

The radiation source is preferably arranged to direct radiation normally of the plate. The radiation source is preferably a light-emitting diode and each detector preferably includes a photodiode. The plate may be optically transparent and the reflective regions may be provided by an opaque reflective layer on the plate. The encoder preferably provides a fault signal to a display in response to detection of loss of complementarity.

The encoder preferably includes processing means that is arranged to receive the first and second outputs and the processing means is arranged to determine the location of the boundary between adjacent regions by comparing the level of the first and second outputs and determining when they are equal. The processing means preferably is arranged to determine the position of the plate close to a boundary between adjacent regions by comparing the level of the first and second outputs as one output falls and the other output rises. The processor is preferably arranged to calculate the difference between the levels of the first and second outputs and the sum of the first and second outputs and the processing means is arranged to divide the difference by the sum to provide an indication of the position in accordance therewith.

An optical encoder according to the present invention, will now be described, by way of example, with reference to the accompanying drawings.

DESCRIPTION OF THE PREFERRED EMBODIMENTS

Figure 1:
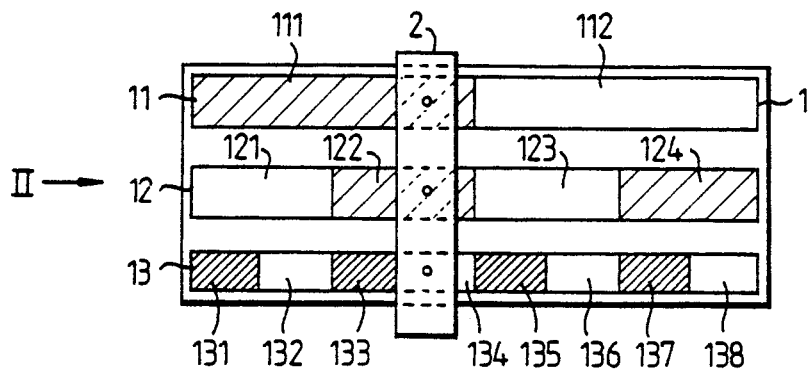
FIG. 1 is a plan view of the encoder.
Figure 2:
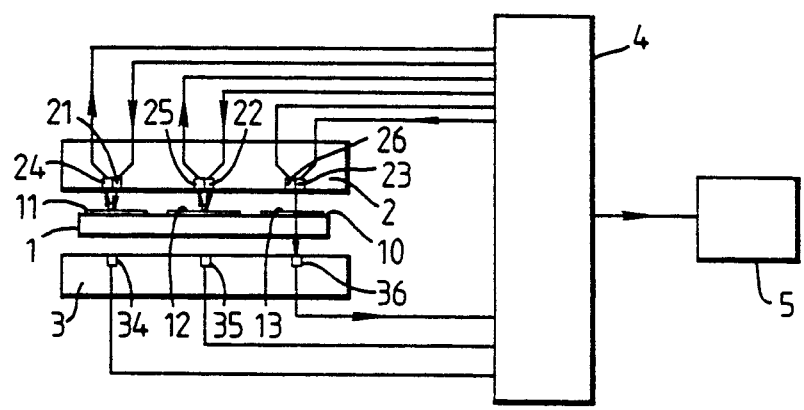
FIG. 2 is an end elevation view along the arrow II of FIG. 1.

The encoder comprises an encoded plate 1 that is displaceable along its length between two read heads 2 and 3. The outputs from the read heads are supplied via a processor 4 to a display 5 which provides an indication of the position of the plate.

The plate 1 is of rectangular shape and made of an optically-transparent material. On its upper surface 10 the plate 1 has three parallel tracks 11 to 13 which extend along the length of the plate and which are each made up of alternate reflective and non-reflective regions. The first track 11 has one reflective region 111 which extends along the left-hand half of the track. The reflective region 111 is made by coating with a layer of metal which is also optically opaque. The remainder of the track 11 is uncoated with metal so that t forms a non-reflective region 112 which is also transparent. This region 112 may be coated or otherwise treated to reduce reflection while not preventing transmission of radiation.

The central track 12 is divided into four different regions 121 to 124 of identical length which are arranged as alternate reflective (opaque) regions 122 and 124, and non-reflective (transparent) regions 121 and 123. The regions 121 to 124 are, therefore, half the length of the regions 111 and 112 in the first track.

The lower track 13 is divided into eight equal regions 131 to 138 which are arranged as alternate reflective (opaque) regions 131, 133, 135 and 137 and non-reflective (transparent) regions 132, 134, 136 and 138. These regions are half the length of those in the central track 12 and one quarter the length of those in the upper track 11.

One of the read heads 2 operates by detecting optical radiation reflected from the plate 1. The head 2 includes three sources of radiation 21 to 23 located in alignment with respective ones of the tracks 11 to 13. The sources 21 to 23 may be, for example, light-emitting diodes and are each arranged to direct a narrow beam of parallel radiation normally to the surface 10 of the encoder plate. In this respect, the sources may be located at one end of a recess in the read head so that only radiation emitted axially of the recess emerges; alternatively, a lens system can be used to produce a parallel beam. The sources are continuously energized by the processor 4 so that all three sources emit radiation at the same time. Located adjacent to each source 21 to 23 is a respective detector 24 to 26 which may be, for example, a photodiode. The detectors 24 to 26 are shielded from the sources 21 to 23 so that they do not receive radiation directly from the sources but only radiation reflected from the respective track 11, 12 or 13 on the encoder plate 1. The output from each detector 24 to 26 is separately supplied to the processor 4.

The other, lower read head 3 operates by detecting radiation from the first read head 2 transmitted through the encoder plate 1. The lower read head 3 includes three detectors 34 to 36 which can be identical with the detectors 24 to 26. The detectors 34 to 36 are located in alignment with the sources 21 to 23 in the first read head 2 so that they receive radiation transmitted through respective ones of the tracks 11 to 13. The outputs from the detectors 34 to 36 are supplied separately to the processor 4.

In the position shown in FIG. 1, the source 21 region 11 of the upper track 11. Radiation is therefore, reflected to the detector 24, giving a high output (1) from detector 24 but is prevented from passing to the detector 34 in the lower read head 3, which gives a low output (0). Similarly, the source 22 and detector 25 in the upper read head are also located above a reflective region 122 in the central track 12, so that a high output (1) is produced by the detector 25, but a low output (0) is produced by the detector 35 in the lower read head 3. The source 23 and detector 26 are, however, located above a non-reflective (transparent) region 134 in the third track 13. Radiation from the source 23 will, therefore, be transmitted through the plate 1 giving a low output (0) from the detector 26 and, a high output (1) from the detector 36 in the lower read head 3. The output from the upper read head 2 will therefore be 110 and that from the lower read head 3 will be 001.

The output from the two read heads 2 and 3, as the encoder plate is moved from right to left will, therefore, be:

| Upper Head 2 | Lower Head 3 |
| --- | --- |
| 101 | 010 |
| 100 | 011 |
| 111 | 000 |
| 110 | 001 |
| 001 | 110 |
| 000 | 111 |
| 011 | 100 |

| -continued | |
| --- | --- |
| Upper Head 2 | Lower Head 3 |
| 010 | 101 |

The two outputs, therefore, are in phase and complementary of one another.

The processor 4 compares the two outputs to confirm that they are complementary. If it detects a loss of complementarity, it supplies a fault signal to the display 5 so that the display provides a visible indication of the existence of the fault. For example, in the position illustrated in FIG. 1, if the third track 13 of the plate was dirty, this would prevent radiation being transmitted through the region 134 so that output from the lower head 3 would become 000 which is no longer complementary to the output from the upper head 2 of 110. Similarly, dirt on, for example the reflective region 111 would change the output of the upper head 2 to be 010 while the output of the lower head would remain as 001. Failure of one of the sources 21 to 23 or detectors 24 to 26 or 34 to 36 would also cause the two outputs to become non-complementary. The encoder, therefore, can check for faults while enabling the entire area of the plate to be utilized.

Figure 3:
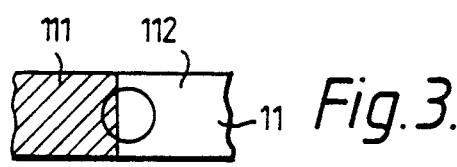
FIG. 3 illustrates operation of a part of the encoder to a larger scale.

The radiation incident on each track, and hence the radiation reflected or transmitted to the detectors, is not a point source but has dimensions, as shown in FIG. 3. Movement of the encoder plate 1 along its length will not, therefore, cause an abrupt change in the outputs of the detectors when the boundary between a reflective and non-reflective region moves across their field-of-view. Instead, the amount of radiation incident on the detectors will vary gradually according to the respective areas of the radiation image incident on reflective and non-reflective regions.

Figure 4:
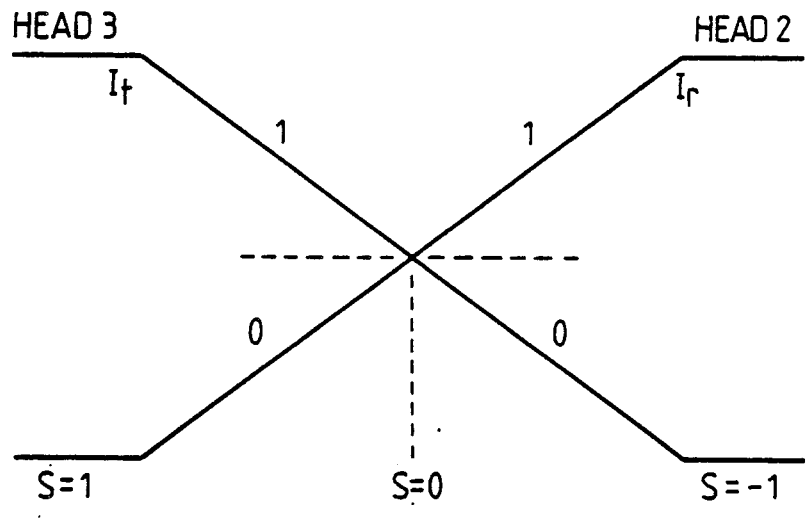
FIG. 4 is a graph illustrating outputs from a part of the encoder.

When the encoder plate 1 is displaced, the intensity change seen by each detector, and hence its output, will vary in a linear fashion, as shown in FIG. 4. The processing unit 4 detects the cross-over point of the two outputs and uses this as the trigger level where 0 changes to 1 or vice versa. This arrangement can be a particular advantage with encoders in which there is difficulty in setting a trigger level because of, for example, different responses from different ones of the detectors or variation in response at different positions along the encoder plate.

By a similar technique, the relative intensity of the two signals may be used to give an increased, analogue resolution in addition to the absolute digital resolution obtained, close to the boundary between reflective and non-reflective and non-reflective regions. In this technique, the processing unit 4 derives two signals, one from the difference between the transmitted and reflected intensities It−Ir, and one from the sum of the transmitted and reflected intensities It−Ir which two signals are then divided by one another to obtain an indication of position S so that: $S=(It-Ir)/(It+Ir)$.

The lowest value of It and Ir will be 0 so that the value of S will, therefore, vary from $S=+1$ (at the far left of FIG. 4) where radiation from the source is entirely transmitted through the plate 1 to the detector in the lower read head 3, through $S=0$ (at the boundary cross-over point) where the amount of radiation reflected back to the detector in the upper read head 2 is equal to that transmitted through the plate to the detector in the lower read head, to $S=-1$ (at the far right of FIG. 4) where radiation from the source is entirely reflected to the detector in the upper read head. The change in position of the encoder plate between $S=-1$ and $S=+1$ is equivalent to the width of the radiation from the source incident on the plate.

The invention can be used with various different forms of encoders such as, for example, those using the Grey code. The encoder plate could be of circular shape with concentric tracks. Instead of having a fixed read head and a movable plate, the plate could be fixed and the read head be movable.

What I claim is:

1. An optical encoder comprising: an optically-encoded plate having regions that are optically reflective and opaque and regions that are non-reflective and transparent; a radiation source, the radiation source being located on one side of the plate and directing radiation onto the plate; a first detector, said first detector being located on said one side of the plate and providing a first output in response to radiation reflected from the reflective regions; a second detector, said second detector being located on the opposite side of the plate and providing a second output in response to radiation transmitted through the transparent regions of the plate such that said first and second outputs are normally complementary; and a processor connected with said first and second detectors which compares the level of said first and second outputs as one output falls and the other output rises, and determines the position of the plate close to a boundary between adjacent ones of the regions in accordance therewith.

2. An optical encoder according to claim 1, wherein the plate has a plurality of parallel tracks, each track having alternate reflective and non-reflective regions, wherein the regions of one track differ in length from regions of another track, a plurality of first detectors, said first detectors being located on said one side of each track and providing an output in response to radiation reflected from the reflective regions of each track, and a plurality of second detectors, said second detectors being located on the output in response to radiation transmitted through the transparent regions of each track.

3. An optical encoder according to claim 1, wherein the radiation source is located to direct radiation normally of the plate.

4. An optical encoder according to claim 1, wherein the radiation source is a light-emitting diode.

5. An optical encoder according to claim 1, wherein each detector includes a photodiode.

6. An optical encoder according to claim 1, wherein the plate is optically transparent, and wherein the reflective regions are provided by an opaque reflective layer on the plate.

7. An optical encoder according to claim 1, including a display, and wherein the processor provides a fault signal to the display in response to any loss of complementarity of said first and second outputs.

8. An optical encoder according to claim 1, wherein the processor compares the level of said first and second outputs, to determine when they are equal, and determines the location of a boundary between adjacent ones of the regions in accordance therewith.

9. An optical encoder according to claim 1, wherein the processor compares the level of said first and second outputs as one output falls and the other output rises, and determines the position of the plate close to a boundary between adjacent ones of the regions in accordance therewith.

10. An optical encoder according to claim 1, wherein the processor calculates the difference between the levels of said first and second outputs and the sum of said first and second outputs, and wherein the processor divides the difference by the sum and provides an indication of the position in accordance therewith.

11. An optical encoder comprising: an optically-encoded plate, the plate having a plurality of parallel tracks, each track having alternate optically reflective and non-reflective regions, the regions of one track differing in length from regions of another track; a radiation source, the radiation source being located on one side of the plate and directing radiation onto the plate; a plurality of first detectors, said first detectors being located on one side of each said track and providing an output in response to radiation reflected from the reflective regions of each track; a plurality of second detectors, said second detectors being located on the opposite side of each track and providing an output in response to radiation transmitted through the transparent regions of each track, such that said first and second outputs are normally complementary; and a processor connected with said first and second detectors which detects any loss of complementarity of said first and second outputs, and wherein said processor compares the level of said first and second outputs as one output falls and the other output rises and determines the position of the plate close to a boundary between adjacent ones of the regions in accordance therewith.

* * * * *